(12) United States Patent
Jovenall et al.

(10) Patent No.: US 10,449,973 B2
(45) Date of Patent: Oct. 22, 2019

(54) DEVICES, SYSTEMS, AND METHODS FOR RELAYING VOICE MESSAGES TO OPERATOR CONTROL UNITS OF REMOTE CONTROL LOCOMOTIVES

(71) Applicant: Laird Technologies, Inc., Earth City, MO (US)

(72) Inventors: Jeremy Jovenall, Mercer, PA (US); Oleh Szklar, Saint Hubert (CA)

( * ) Notice: Subject to any disclaimer, the term of this patent is extended or adjusted under 35 U.S.C. 154(b) by 429 days.

(21) Appl. No.: 15/397,186

(22) Filed: Jan. 3, 2017

(65) Prior Publication Data
US 2018/0186386 A1 Jul. 5, 2018

(51) Int. Cl.
*B61C 17/12* (2006.01)
*H04W 52/04* (2009.01)
(Continued)

(52) U.S. Cl.
CPC .............. *B61C 17/12* (2013.01); *G10L 15/22* (2013.01); *G10L 15/26* (2013.01); *H04B 1/385* (2013.01); *H04B 1/3822* (2013.01); *H04B 7/155* (2013.01); *H04W 4/80* (2018.02); *H04W 52/04* (2013.01); *G10L 2015/223* (2013.01); *H04B 2001/3866* (2013.01)

(58) Field of Classification Search
None
See application file for complete search history.

(56) References Cited

U.S. PATENT DOCUMENTS 5,511,749 A  4/1996 Horst et al.
5,924,651 A * 7/1999 Penza ..................... B61L 23/06
246/124
(Continued)

FOREIGN PATENT DOCUMENTS

CA      2266998 A1     9/2000
WO   WO-2005/061297 A1   7/2005

OTHER PUBLICATIONS

European Search Report for European Application No. 18150044.8 which claims priority to the instant application, dated Jun. 29, 2018, 9 pages.

*Primary Examiner* — Christian Chace
*Assistant Examiner* — Edward Torchinsky
(74) *Attorney, Agent, or Firm* — Harness, Dickey & Pierce, P.L.C.; Anthony G. Fussner (57) ABSTRACT

According to various aspects, exemplary embodiments are disclosed of devices, systems, and methods related relaying voice messages to operator control units of a locomotive. In an exemplary embodiment, an operator control unit generally includes a user interface configured to receive one or more commands from an operator for controlling a locomotive, a wireless communication interface configured to transmit data to and receive data from a locomotive control unit of the locomotive, and memory configured to store multiple voice messages corresponding to the locomotive. The operator control unit also includes a processor configured to receive a voice message number from the locomotive control unit of the locomotive via the wireless communication interface, retrieve one of the multiple stored voice messages from memory corresponding to the received voice message number, and transmit the retrieved voice message to an earpiece of the operator via a wired transmission and/or near-field wireless transmission.

20 Claims, 4 Drawing Sheets

(51) Int. Cl.
     *H04B 1/3827*    (2015.01)
     *H04B 1/3822*    (2015.01)
     *H04B 7/155*     (2006.01)
     *G10L 15/26*     (2006.01)
     *G10L 15/22*     (2006.01)
     *H04W 4/80*      (2018.01)

(56) References Cited

U.S. PATENT DOCUMENTS

| | | | |
|---|---|---|---|
| 6,232,887 B1* | 5/2001 | Carson | B61L 23/06 |
| | | | 340/4.21 |
| 6,691,005 B2 | 2/2004 | Proulx | |
| 6,863,247 B2 | 3/2005 | Horst | |
| 6,975,927 B2 | 12/2005 | Szklar et al. | |
| 7,812,740 B2* | 10/2010 | Mergen | B60Q 5/008 |
| | | | 340/436 |
| 2010/0039514 A1* | 2/2010 | Brand | B61L 3/127 |
| | | | 348/148 |
| 2010/0131127 A1 | 5/2010 | DeSanzo | |

* cited by examiner

DEVICES, SYSTEMS, AND METHODS FOR RELAYING VOICE MESSAGES TO OPERATOR CONTROL UNITS OF REMOTE CONTROL LOCOMOTIVES

FIELD

The present disclosure generally relates to devices, systems, and methods for relaying voice messages to operator control units of remote control locomotives.

BACKGROUND

This section provides background information related to the present disclosure which is not necessarily prior art.

A locomotive may include a locomotive control unit configured to control one or more aspects of the locomotive, including starting, stopping, speed, braking, switching, etc. Operators may use an operator control unit to control the locomotive. The operator control unit may send commands, instructions, etc. to the locomotive control unit via a wireless interface to control the locomotive. In some configurations, the locomotive control unit may send messages back to the operator control unit to be displayed on a display of the operator control unit. Status messages may be transmitted from the locomotive control unit to an operator over a voice radio channel.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The inventor herein has recognized that some remote control locomotive (RCL) systems include operator control units (OCUs) that communicate with locomotive control units (LCUs) to provide operator feedback as to the state of the locomotive. The feedback may be provided over a cab voice radio channel, or displayed on a display of the operator control unit. While this feature is appreciated by remote control operators by providing a heads-up operating status feedback, it can create excessive voice radio traffic and can distract other railyard personnel if used too frequently, limit availability of the voice channel for other railyard operations, etc. In systems that use this feature, the voice messages can broadcast over a two-way radio channel. This channel is typically used by everyone in a particular geographic location of the yard in related crafts. This may create interference because people may be attempting to have conversations over this channel. Radio etiquette rules can dictate that these conversations must be job related, and can actually be safety critical in many cases because they relay instructions for locomotive and train movements.

The inventor has recognized voice radio traffic throughout the railyard may be reduced by sending voice messages directly to only the RCL crew responsible for the locomotive generating the voice message. This may avoid broadcasting the voice messages over the voice channel.

Disclosed herein are exemplary embodiments of devices, systems and methods for relaying voice messages to operator control units of locomotives. Some example systems may provide digital feedback through a radio frequency (RF) link that is used for control between an operator control unit (e.g., a handheld unit, etc.) and a locomotive control unit associated with a locomotive. The RF data packet sent from the LCU to the OCU may include a voice message number when applicable.

Once the voice message number is received by the operator control unit (e.g., via the RF data packet, etc.), a component inside the OCU can retrieve the voice message for that message number. The voice message can be digitally stored in the operator control unit. Once the message is retrieved it may be sent to an earpiece worn by the operator via a near-field wireless transmission (e.g., BLUETOOTH, etc.), sent to the earpiece over a wired connection between the OCU and the earpiece, retransmitted on the same radio channel that the voice radio is using at a power level low enough to only reach the operator holding the OCU, etc. In the latter case, an additional radio can be installed in the operator control unit for the rebroadcast on a voice channel.

In some embodiments, greater (e.g., complete, etc.) railyard monitoring may be implemented using another device that could monitor all RF transmissions, decode them, and play them in a yard office in real time, log text versions of the messages for review, etc. The latter could be useful in some cases where a yard manager monitors the messages over the voice radio as a way to confirm equipment is working properly. One location for the monitoring device that may act as a sniffer for the entire yard could be a repeater, which could then relay the data to the yard office over a network, fiber optic link, a co-axial link, an Ethernet link, etc.

Some voice messages may relay a status of the locomotive to the operator(s) (e.g., crew, etc.) responsible for the locomotive. The voice messages may include unsolicited messages (e.g., a fault detected by the RCL system, etc.). An example unsolicited message is "Locomotive 1234 Pullback Protection On with Medium Train Brake" to alert the crew that the system just started applying pullback and stopping protection.

The voice messages may include solicited messages (e.g., in response to a status request from an operator made via the operator control unit) may be transmitted. An example solicited message is "Locomotive 1234, Emergency Brake Recovery from A", where "Locomotive 1234" would be the client ID and actual locomotive running number (e.g., [Client ID] 2440, etc.) and "A" is referencing the operator control unit that is assigned as OCU A (e.g., there may be OCU A and OCU B for a two-person crew, etc.). In the cases where there are multiple OCUs assigned to a locomotive, the voices messages may be specific to only one of the multiple OCUs (e.g., only OCU A or OCU B, etc.), or may be specific to more than one (or all) of the multiple OCUs (e.g., OCU A and OCU B, etc.), etc.

In some embodiments, voice messages could be digitally stored on a module inside the operator control unit. This can provide the ability to have different dictionaries for different customers that could be updated during the pairing session between the locomotive control unit and operator control unit. The LCU could receive an updated dictionary through a wireless link (e.g., cell modem link, etc.), a technician plugging a laptop into the LCU (e.g., if the technician was already on the locomotive for other reasons, etc.), etc.

During operation, a locomotive control unit could send a message number to the operator control unit. The OCU could then use the received message number from the LCU to retrieve the actual voice message from the dictionary, where the actual voice message in the dictionary corresponds to the received message number.

Any suitable channel may be used to transmit voice message numbers from the LCU to the OCU. For example, the voice message numbers may be sent over a same RF channel as the one used to transmit control information (e.g., a data RF telegram, command data, etc.) from the OCU to the LCU.

In other embodiments, a voice message may be transmitted directly from the LCU to the OCU. For example, in cases where the bandwidth of the RF channel is sufficient to send voice message content, the actual voice message content may be transmitted to the OCU over the RF channel. The actual voice message content may be transmitted instead of the voice message number, in addition to the voice message number, etc.

In some embodiments, a remote control locomotive repeater may be used to receive and retransmit messages between the locomotive control unit and the operator control unit. This may extend RF range within the railyard, the LCU and OCU voice message transmission range, etc.

In some of the exemplary embodiments disclosed herein, an operator control unit can include a user interface configured to receive one or more commands from an operator for controlling a locomotive. The operator control unit can also include a wireless communication device. The wireless communication device is configured to transmit command data corresponding to the one or more commands to a locomotive control unit on the locomotive.

The operator control unit may be any suitable controller for sending commands to control a locomotive (e.g., train, engine, etc.), including a remote control, a locomotive control, a locomotive operation device, etc. The operator control unit may send any suitable commands, including switch commands, brake commands, speed commands, direction, bell, horn, headlight, sand, status requests, motion detection, tilt detection, pitch and catch, low battery voltage condition, fault detection, etc. Accordingly, the operator control unit may allow an operator (e.g., user, locomotive control person, engineer, rail yard coordinator, etc.) to control movement and/or other functions of the locomotive.

The operator control unit may include any suitable user interface for receiving commands and/or other input from an operator, including a touch screen interface, keypad, buttons, etc. The operator control unit may include a display, lights, light emitting diodes (LEDs), indicators, etc. for displaying information to the operator. The operator control unit may include one or more processors, memory (e.g., one or more hard disks, flash memory, solid state memory, random access memory, read only memory, etc.), etc. configured to operate the OCU and store information related to operation of the OCU. The operator control unit may include one or more wireless communication devices, antennas, etc. for wireless communication. The operator control unit may also include any suitable element, device, etc. for determining a location of the OCU, including a global positioning system (GPS) antenna, receiver, etc. In some embodiments, the operator control unit may include an audible alert device to notify an operator of one or more different conditions.

The operator control unit may control the locomotive via wireless signals transmitted to a locomotive control unit located at the locomotive. The locomotive control unit may be any suitable controller for controlling operation of the locomotive and may be coupled to one or more systems of the locomotive including a braking system, an engine and/or driving system, a switching system, a navigational system, etc. The locomotive control unit may be mounted on the locomotive, included inside the locomotive, attached to the locomotive, incorporated into the locomotive, etc. In some embodiments, the locomotive control unit may not include any portions that are not located on the locomotive and/or other parts of the train.

As stated above, the operator control unit may transmit commands, data, messages, signals, etc. to the locomotive control unit via a wireless network. The wireless network may be any suitable wireless network, including RF, WiFi, Bluetooth, etc. In some embodiments, the operator control unit may transmit (e.g., send, etc.) signals to the locomotive control unit via one-way communication, such that the OCU does not receive signals back from the locomotive control unit. In other embodiments, the operator control unit may send and receive signals from the locomotive control unit via two-way communication between the OCU and the LCU. In some embodiments, the operator control unit may send command signals only to the locomotive control unit, may not send command signals to any central station or location not located at the locomotive, may send data to a remote control locomotive repeater, etc.

Command data may be transmitted from the operator control unit to the locomotive control unit via any suitable protocol, including RF channels, etc. For example, the command data may be transmitted in one or more messages which may be included in one or more RF packets and transmitted on an RF channel.

Figure 1:
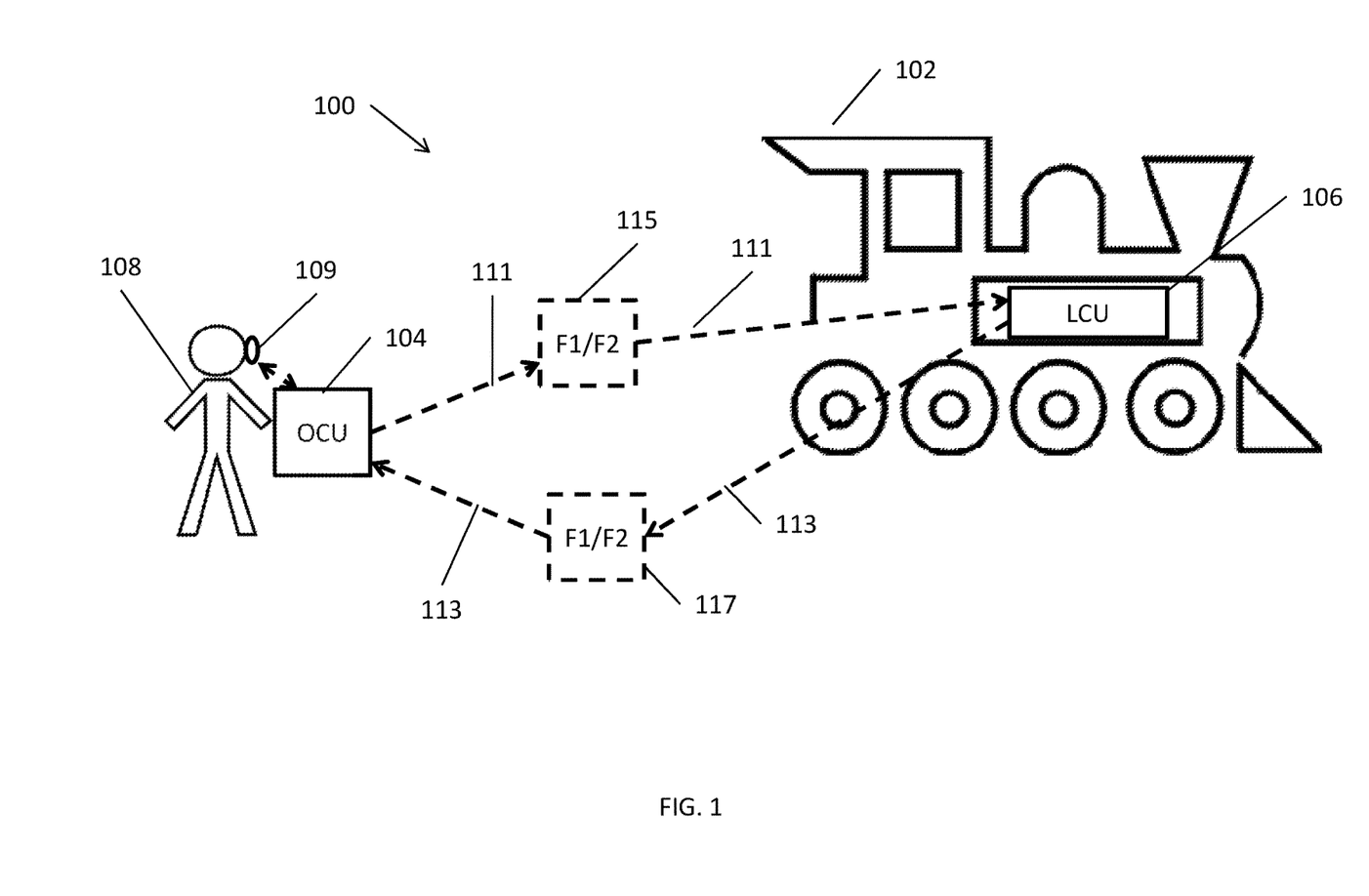
FIG. 1 is a block diagram of an example system for relaying voice messages to an operator control unit of a locomotive according to one exemplary embodiment of the present disclosure.

With reference to the figures, FIG. 1 illustrates an example system 100 according to some aspects of the present disclosure. The system 100 includes a locomotive 102 having a locomotive control unit 106, which may include any suitable locomotive control unit (e.g., machine control unit, etc.) as described herein.

The system 100 also includes an operator control unit 104, which may be any suitable operator control unit as described herein. The operator control unit 104 may receive commands from an operator 108, and transmit the commands to the locomotive control unit 106 for controlling the locomotive 102.

As shown in FIG. 1, the operator control unit 104 may allow an operator 108 to control the locomotive 102, send commands to the locomotive control unit 106, etc., while the operator 108 is remote from the locomotive 102. Accordingly, the operator 108 may control the locomotive 102 from a variety of suitable positions. In some embodiments, the operator 108 may be required to be within a threshold distance of the locomotive 102, such as in sight of the locomotive 102, within a wireless network signal strength range, etc.

FIG. 1 illustrates a locomotive 102, an operator 108, and an operator control unit 104 in communication with a locomotive control unit 106. As shown in FIG. 1, command signals 111 may be sent in a direction from the operator control unit 104 to the locomotive control unit 106. This may be one-way communication channel for the command signals 111, or a two-way communication channel may be used with 113 representing the second half of the two-way communications.

An optional repeater 115 may be used to transmit the command signals 111 from the OCU 104 to the LCU 106. The repeater 115 is illustrated as having two frequency indicators (F1, F2), but other embodiments may include more or less frequencies. The repeater 115 may include multiple antennas (e.g., two antennas, etc.). Alternatively, or additionally, command signals 111 may be transmitted directly from the OCU 104 to the LCU 106 instead of through repeater 115.

Voice message signals 113 may be transmitted from the locomotive control unit 106 to the operator control unit 104. The voice message signals 113 may be transmitted on the same RF data channel used to transmit data from the LCU 106 to the OCU 104. For example, the voice message signals 113 may include a voice message number corresponding to a voice message status stored on the OCU 104. In other embodiments (e.g., where the bandwidth of the RF channel transmitting signals 113 is high enough), the voice message signals 113 may include actual voice message content.

An optional repeater 117 may be used to transmit the voice message signals 113 (and optionally any other RF data packets including command data packets) from the LCU 106 to the OCU 104. The repeater 117 is illustrated as having two frequency indicators (F1, F2), but other embodiments may include more or less frequencies. The frequency indicators F1, F2 may be receive frequencies, transmit frequencies, both receive and transmit (e.g., transceiver, etc.) frequencies, etc.

These frequency indicators F1, F2 of the repeater 117 may be the same or different frequencies from the frequency indicators F1, F2 of the repeater 115. The repeater 117 may include multiple antennae (e.g., two antennae, etc.). Alternatively, or additionally, voice message signals 113 may be transmitted directly from the LCU 106 to the OCU 104 instead of through repeater 117.

In some embodiments, the operator 108 may have a wireless earpiece 109, which may include a near-field wireless transmission (e.g., BLUETOOTH, etc.) earpiece, headset, etc. The operator control unit 106 may transmit voice messages to the earpiece 109 using near-field wireless transmission. For example, the OCU 104 may transmit a voice message corresponding to a voice message number received from the LCU 106, may transmit actual voice message content received from the LCU 106, etc.

Although a single locomotive 102, operator 108, operator control unit 104 and locomotive control unit 106 is illustrated in FIG. 1, in other embodiments the system 100 may include more than one locomotive 102, more than one operator 108 and OCU 104, more than one LCU 106, an OCU 104 in two-way communication with an LCU 106, etc.

Figure 2:
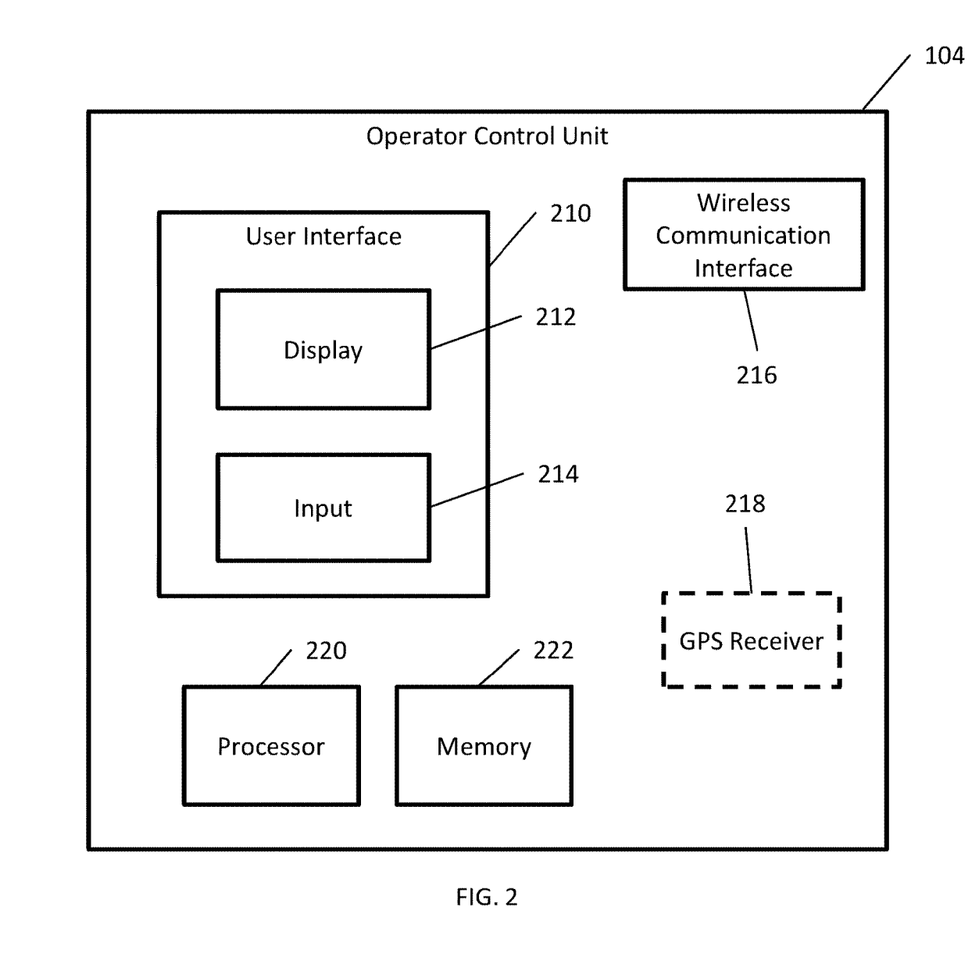
FIG. 2 is a block diagram of the example operator control unit of FIG. 1.

FIG. 2 illustrates a block diagram of the operator control unit 104 as shown in FIG. 1. The operator control unit 104 includes a user interface 210 for receiving input (e.g., commands, etc.) from an operator. The user interface may include a display 212, which may include any suitable display (e.g., a liquid crystal display (LCD), light emitting diodes (LED), indicator lights, etc.). Although not shown, in some embodiments the operator control unit may include an audible alert device to notify the operator of one or more different conditions. The user interface may include an input 214, which may include any suitable input (e.g., a keypad, touchscreen, switches, etc.). In other embodiments, the operator control unit 104 may not include a display 212 or an input 214.

The operator control unit 104 also includes a wireless communication interface 216. As described above, the wireless communication interface 216 may communicate with a locomotive control unit of a locomotive via one-way or two-way communication, using any suitable wireless communication protocol (e.g., RF, WiFi, Bluetooth, etc.).

The operator control unit can include an optional GPS receiver 218, which is configured to receive GPS signals to determine a location of the operator control unit 104. In other embodiments, other suitable devices capable of determining a location of the operator control unit 104 may be used.

The operator control unit 104 includes a processor 220, which may be any suitable processor including, but not limited to, a microprocessor, microcontroller, integrated circuit, digital signal processor, etc. The processor 220 is configured to receive a voice message number from the locomotive control unit 106 of the locomotive 102 via the wireless communication interface 216, retrieve one of multiple stored voice messages from memory 222 corresponding to the received voice message number, and transmit the retrieved voice message to the operator 108 (e.g., send the voice message to an earpiece 109 of the operator 108 via near-field wireless transmission, etc.).

The operator control unit also includes memory 222, which may be any suitable memory capable of storing computer-executable instructions and data, including but not limited to, a hard drive, flash memory, random access memory, etc. The memory 222 is configured to store multiple voice messages corresponding to the locomotive 102.

In some embodiments, the operator control unit 104 may be configured to receive actual voice message content from the locomotive control unit 106 via the wireless communication interface 216. The processor 220 may be configured to relay the retrieved actual voice message content to the operator 108 (e.g., send the voice message to an earpiece 109 of the operator 108 via near-field wireless transmission, etc.). In those cases, the memory 222 may not need to store voice messages corresponding to voice message numbers, and the processor 220 may not need to retrieve voice messages corresponding to voice message numbers received at the wireless communication interface 216.

In some embodiments, the earpiece 109 of the operator 108 may be wired to the operator control unit 104. In those cases, the operator control unit 104 may transmit the voice message to the earpiece 109 of the operator 108 via the wired connection.

Figure 3:
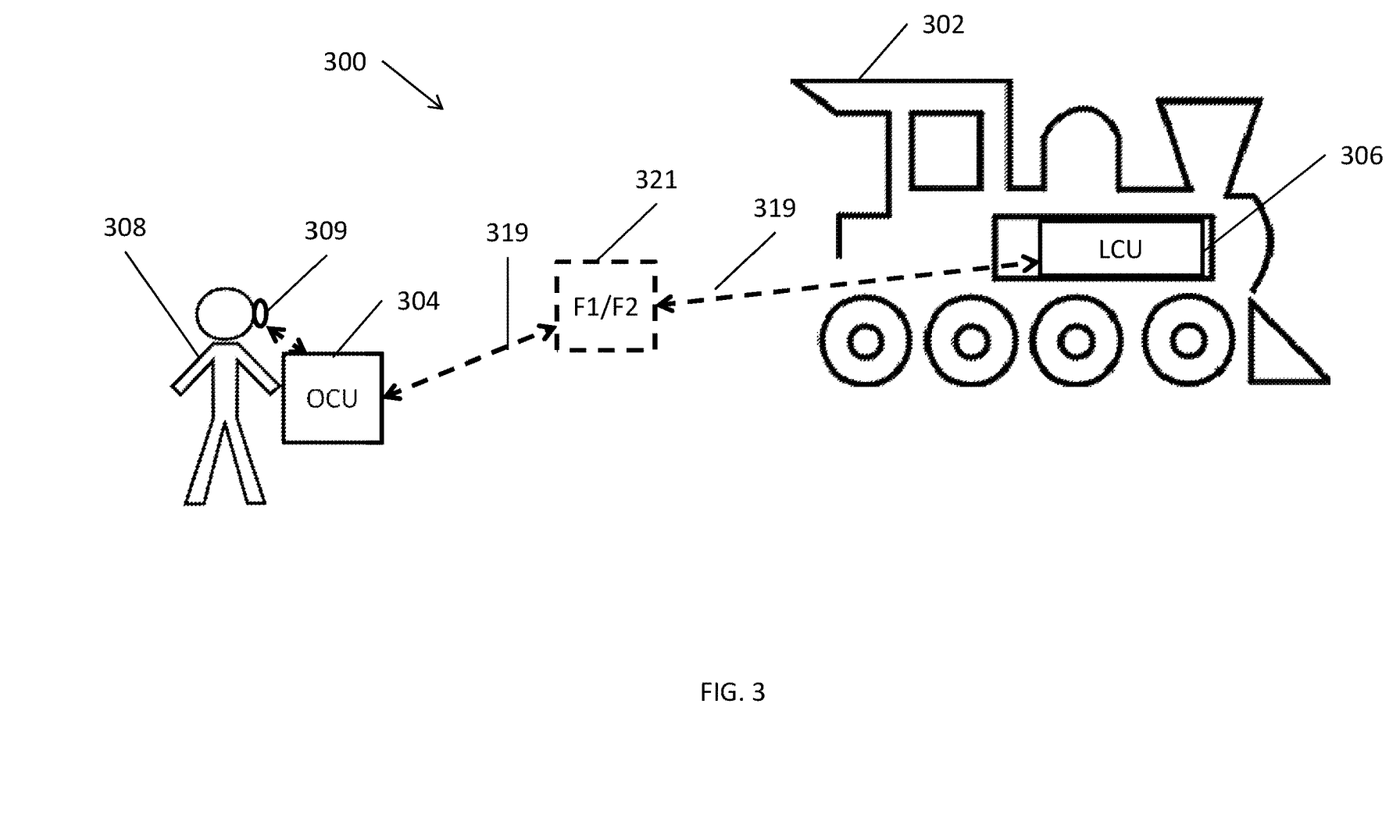
FIG. 3 is a block diagram of another example system for relaying voice messages to an operator control unit of a locomotive according to another exemplary embodiment of the present disclosure.

FIG. 3 illustrates another example system 300 according to some aspects of the present disclosure. The system 300 includes a locomotive 302 having a locomotive control unit 306, which may include any suitable locomotive control unit as described herein.

The system 300 also includes an operator control unit 304, which may be any suitable operator control unit as described herein. The operator control unit 304 may receive commands from an operator 308, and transmit the commands to the locomotive control unit 306 for controlling the locomotive 302.

As shown in FIG. 3, the operator control unit 304 may allow an operator 308 to control the locomotive 302, send commands to the locomotive 302, etc., while the operator 308 is remote from the locomotive 302. Accordingly, the operator 308 may control the locomotive 302 from a variety of suitable positions. In some embodiments, the operator 308 may be required to be within a threshold distance of the locomotive 302, such as in sight of the locomotive 302, within a wireless network signal strength range, etc.

FIG. 3 illustrates a locomotive 302, an operator 308, and an operator control unit 304 in communication with a locomotive control unit 106. As shown in FIG. 3, communication channel 319 (e.g., RF channel, etc.) allows two-way communication (e.g., digital communication, etc.) between the operator control unit 304 and the locomotive control unit 306. Accordingly, communication channel 319 may allow commands to be sent from the OCU 304 to the LCU 306, and also voice message numbers (or actual voice message content) to be sent from the LCU 306 to the OCU 304. For example, the communication channel may transmit feedback data from the LCU 306 to the OCU 304 regarding one or more states of operation of the locomotive.

An optional repeater 321 may be used to transmit signals between the OCU 304 and the LCU 306 using communication channel 319. The repeater 321 is illustrated as having two frequency indicators (F1, F2), but other embodiments may include more or less frequencies. The repeater 321 may include multiple antennas (e.g., two antennas, etc.). Alternatively, or additionally, command signals, voice message numbers, actual voice message content, etc. may be transmitted directly between the OCU 104 and the LCU 106.

As described above, the operator control unit 304 includes a user interface configured to receive one or more commands from the operator 308 for controlling the locomotive 302, a wireless communication interface configured to transmit data to and from the locomotive control unit 306 of the locomotive, memory configured to store multiple voice messages corresponding to the locomotive 302, and a processor configured to receive a voice message number from the locomotive control unit 306 of the locomotive 302 via the wireless communication interface, retrieve one of the multiple stored voice messages from memory corresponding to the received voice message number, and transmit the retrieved voice message to the operator 308.

For example, retrieved voice messages may be transmitted from the OCU 304 to a headset 309 of the operator 308 (e.g., via near-field wireless transmission such as BLUETOOTH, etc.), thereby allowing the operator 308 to hear the voice messages. The voice messages may be transmitted using near-field wireless transmission communication protocols between the headset 309 and the OCU 304, which may inhibit the voice messages from interfering with other operators. In this case, the OCU 304 may include a near-field wireless transmission communication interface for communicating with the headset 309, which may or may not be part of the wireless communication interface of the OCU 304.

Alternatively, or in addition, the OCU 304 may include a wireless radio (e.g., in addition to the wireless communication interface used to communicate with the LCU 306, etc.) configured to transmit the retrieved voice message to the operator 308. In some embodiments, the OCU 304 may transmit the retrieved voice message via the wireless radio over a voice channel at a power level that is below a specified threshold, to inhibit reception of the transmitted voice message by operators other than the operator 308 associated with the OCU 304. For example, the specified threshold may be a power level at which the transmitted voice message is not received by operators at who are more than five feet, ten feet, one hundred feet, etc. from the OCU 304.

In some embodiments, the OCU 304 may be configured to transmit a status request to the LCU 306 to request a current status of the locomotive 302. In response to the transmitted status request, the OCU 304 may receive a voice message number from the LCU 306 corresponding to a voice message indicative of the status of the locomotive. This may allow the operator 308 to solicit status information from the LCU 306 in the form of voice messages.

The LCU 306 may be configured to determine whether a predefined event (e.g., braking, stopping, etc.) has occurred. In response to determining that the predefined event has occurred, the LCU 306 may be configured to transmit a voice message number to the operator control unit corresponding to a voice message indicative of the predefined event. This may allow the OCU 304 to receive unsolicited voice messages when the LCU 306 determines that an event has occurred regarding the locomotive 302, even if the OCU 304 is not currently requesting a status voice message.

Figure 4:
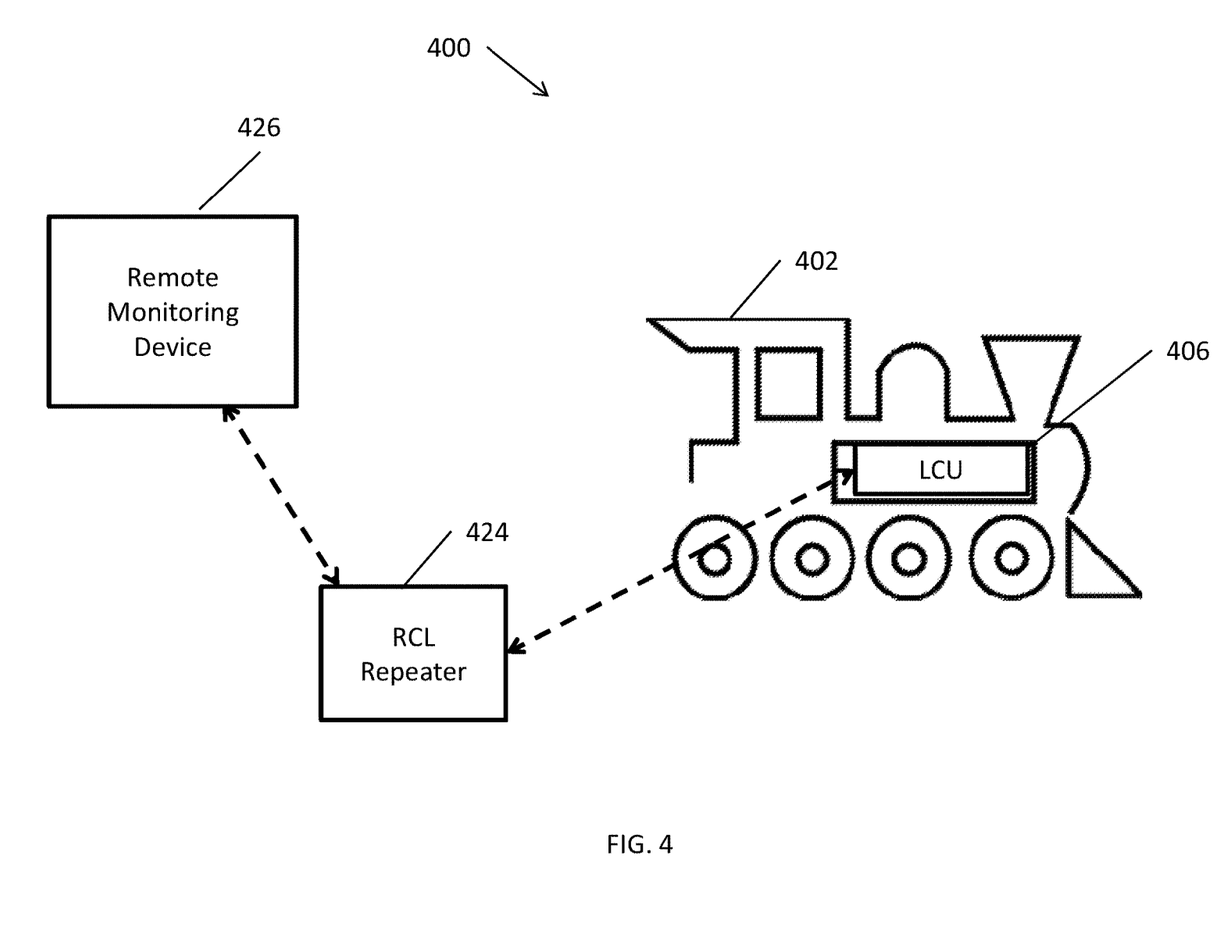
FIG. 4 is a block diagram of an example system for relaying voice messages to a remote monitoring device according to another exemplary embodiment of the present disclosure.

FIG. 4 illustrates another example embodiment of the present disclosure, in which a system 400 includes a locomotive 402, a locomotive control unit 306, a remote control locomotive (RCL) system repeater 424 and a remote monitoring device 426.

The RCL repeater 424 is configured to relay a voice message number transmitted from the locomotive control unit 406 to the remote monitoring device 426. The remote monitoring device 426 may then be configured to play a voice message corresponding to the transmitted voice message number when the voice message number is received from the RCL repeater 424. This can allow a railyard manager to monitor operation of the locomotive, etc.

Alternatively, or additionally, the remote monitoring device 426 may be configured to store a text version of the voice message corresponding to the transmitted voice message number when the voice message number is received from the RCL repeater 424. This may allow for storage of the voice messages for later review, etc.

In some embodiments, the repeater 424 is configured to relay the voice message number to the remote monitoring device 426 via a fiber optic link, a network link, etc. As should be apparent, other embodiments may relay the voice message number from the repeater 424 to the remote monitoring device 426 via an RF channel, etc.

According to another example embodiment, an exemplary method of relaying voice messages to an operator control unit (OCU) associated with a locomotive remote control unit is disclosed. The exemplary method generally includes receiving a voice message from a locomotive control unit (LCU) of a locomotive at a wireless interface of an operator control unit, and transmitting the received voice message to an earpiece of the operator via a wired transmission and/or a near-field wireless transmission to allow the operator to listen to the retrieved voice message.

Receiving the voice message may include receiving a voice message number and retrieving a voice message corresponding to the received voice message number from one of multiple voice messages stored in a memory of the operator control unit.

The earpiece may include a BLUETOOTH receiver, and transmitting the received voice message includes transmitting the received voice message via a BLUETOOTH near-field wireless transmission to the BLUETOOTH receiver of the operator. In some embodiments, transmitting may include receiving the voice message at a repeater, and relaying the voice message number to a remote monitoring device.

Some embodiments may provide one or more advantages including freeing a voice radio channel without sacrificing functionality, allowing voice messages to be directed to operators associated with a specific locomotive without distracting other operators, reducing interference of voice communication channels needed for safety critical communication, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An operator control unit for a locomotive, the operator control unit comprising:
   a user interface configured to receive one or more commands from an operator for controlling a locomotive;
   a wireless communication interface configured to transmit command data to and receive feedback data from a locomotive control unit (LCU) of the locomotive, via data radio frequency (RF) packets;
   memory configured to store multiple voice messages corresponding to the locomotive, each of the multiple stored voice messages corresponding to a different message number; and
   a processor configured to receive a voice message number from the feedback data RF packet received from the locomotive control unit of the locomotive via the wireless communication interface, retrieve one of the multiple stored voice messages from memory corresponding to the received voice message number, and transmit the retrieved voice message to the operator via a wired transmission and/or near-field wireless transmission to allow the operator to listen to the retrieved voice message.

2. The operator control unit of claim 1, wherein the wireless communication interface includes at least one radio frequency (RF) channel configured to transmit the voice message number.

3. The operator control unit of claim 1, wherein the wireless communication interface includes at least one radio frequency (RF) channel configured to transmit an actual voice message content from the locomotive control unit to the operator control unit.

4. The operator control unit of claim 1, further comprising a near-field wireless communication interface, wherein the processor is configured to transmit the retrieved voice message to an earpiece of the operator via the near-field wireless communication interface of the operator control unit.

5. The operator control unit of claim 1, further comprising a wireless radio, wherein the processor is configured to transmit the retrieved voice message to the operator via the wireless radio of the operator control unit.

6. The operator control unit of claim 5, wherein the processor is configured to transmit the retrieved voice message via the wireless radio over a voice channel at a power level that is below a specified threshold, to inhibit reception of the transmitted voice message by operators other than the operator associated with the operator control unit.

7. The operator control unit of claim 1, wherein the operator control unit is configured to:
transmit a status request to the locomotive control unit to request a current status of the locomotive; and
in response to the transmitted status request, receive a voice message number from the locomotive control unit corresponding to a voice message indicative of the status of the locomotive.

8. A system for relaying voice messages to an operator control unit of a locomotive, the system comprising:
an operator control unit having a user interface configured to receive one or more commands from an operator, and a wireless interface configured to transmit the one or more commands to a locomotive via one or more command data radio frequency (RF) packets; and
a locomotive control unit (LCU) coupled to the locomotive and configured to receive the one or more commands from the operator control unit,
wherein the locomotive control unit is configured to transmit voice message content to the operator control unit via the wireless interface of the operator control unit, the voice message content included in one or more feedback data RF packets transmitted from the locomotive control unit to the operator control unit via the wireless interface; and
wherein the operator control unit is configured to transmit the received voice message content to the operator via a wired transmission and/or near-field wireless transmission to allow the operator to listen to the retrieved voice message.

9. The system of claim 8, wherein:
the operator control unit is configured to transmit a status request to the locomotive control unit to request a current status of the locomotive; and
the locomotive control unit is configured to, in response to receiving the status request from the operator control unit, transmit voice message content to the operator control unit indicative of the status of the locomotive.

10. The system of claim 8, wherein the locomotive control unit is configured to:
determine whether a predefined event has occurred; and
in response to a determination that the predefined event has occurred, transmit voice message content to the operator control unit indicative of the predefined event.

11. The system of claim 8, further comprising a repeater, wherein the repeater is configured to relay the voice message content transmitted from the locomotive control unit to a remote monitoring device.

12. The system of claim 11, wherein the remote monitoring device is configured to play the voice message content when the voice message content is received from the repeater, thereby allowing a yard manager to monitor operation of the locomotive.

13. The system of claim 11, wherein the remote monitoring device is configured to store a text version of the voice message content when the voice message content is received from the repeater, thereby allowing for storage of the voice messages for later review.

14. The system of claim 11, wherein the repeater is configured to relay the voice message content to the remote monitoring device via at least one of a fiber optic link, a network link, a co-axial link, and an Ethernet link.

15. The system of claim 8, wherein the wireless interface is a BLUETOOTH wireless communication interface configured to transmit the received voice message content to a BLUETOOTH receiver of the operator.

16. The system of claim 8, wherein:
the operator control unit includes memory configured to store multiple voice messages corresponding to the locomotive; and
the operator control unit includes a processor configured to receive a voice message number from the locomotive control unit of the locomotive via the wireless communication interface, retrieve one of the multiple stored voice messages from memory corresponding to the received voice message number, and transmit the retrieved voice message to an earpiece, headset, or remote device of the operator.

17. A method of relaying voice messages to an operator control unit associated with a locomotive control unit, the method comprising:
receiving a voice message number from a locomotive control unit (LCU) of a locomotive at a wireless interface of an operator control unit, the operator control unit storing multiple voice messages corresponding to the locomotive with each of the multiple stored voice messages corresponding to a different message number;
retrieving one of the multiple stored voice messages from memory corresponding to the received voice message number; and
transmitting the retrieved voice message to the operator via a wired transmission and/or a near-field wireless transmission to allow the operator to listen to the retrieved voice message.

18. The method of claim 17, wherein transmitting the retrieved voice message includes transmitting the retrieved voice message to an earpiece, headset, or remote device of the operator.

19. The method of claim 17, wherein transmitting the retrieved voice message includes transmitting the retrieved voice message via a BLUETOOTH near-field wireless transmission to a BLUETOOTH receiver of the operator.

20. The method of claim 17, further comprising:
receiving the voice message at a repeater; and
relaying the voice message to a remote monitoring device.

* * * * *